United States Patent
Crocker

(10) Patent No.: US 11,192,130 B2
(45) Date of Patent: Dec. 7, 2021

(54) THERMOPLASTIC EXTRUSION MARKINGS

(71) Applicant: Waterblasting, LLC, Stuart, FL (US)

(72) Inventor: James Crocker, Stuart, FL (US)

(73) Assignee: Waterblasting, LLC, Stuart, FL (US)

( * ) Notice: Subject to any disclaimer, the term of this patent is extended or adjusted under 35 U.S.C. 154(b) by 0 days.

(21) Appl. No.: 17/112,693

(22) Filed: Dec. 4, 2020

(65) Prior Publication Data

US 2021/0170434 A1 Jun. 10, 2021

Related U.S. Application Data

(60) Provisional application No. 62/944,788, filed on Dec. 6, 2019.

(51) Int. Cl.
| | | |
|---|---|---|
| *B05B 12/08* | (2006.01) | |
| *B05B 13/00* | (2006.01) | |
| *G01B 21/08* | (2006.01) | |
| *G01D 5/12* | (2006.01) | |
| *G01F 23/292* | (2006.01) | |
| *G01F 23/296* | (2006.01) | |
| *G05B 19/4155* | (2006.01) | |

(52) U.S. Cl.
CPC ............ *B05B 12/08* (2013.01); *B05B 13/005* (2013.01); *G01B 21/08* (2013.01); *G01D 5/12* (2013.01); *G01F 23/292* (2013.01); *G01F 23/296* (2013.01); *G05B 19/4155* (2013.01); *G05B 2219/49056* (2013.01)

(58) Field of Classification Search
None
See application file for complete search history.

(56) References Cited

U.S. PATENT DOCUMENTS

| | | | |
|---|---|---|---|
| 4,247,045 A * | 1/1981 | Mitchell | B60P 3/30 239/156 |
| 5,126,173 A | 6/1992 | Machenaud | |
| 2012/0203475 A1 | 8/2012 | Wilkens | |
| 2016/0032542 A1* | 2/2016 | Crocker | E01C 23/20 404/92 |
| 2018/0230658 A1 | 8/2018 | Wilkens | |

FOREIGN PATENT DOCUMENTS

| | | |
|---|---|---|
| DE | 19750359 | 6/1999 |
| EP | 0225653 | 6/1987 |
| KR | 101509321 | 4/2015 |

OTHER PUBLICATIONS

Written Opinion of the International Searching Authority provided for PCT/US2020/063420 (WO2021113718), dated Jun. 10, 2021.*

* cited by examiner

*Primary Examiner* — Charles Capozzi
(74) *Attorney, Agent, or Firm* — McHale & Slavin, P.A.

(57) ABSTRACT

A thermoplastic extrusion vehicle for continuous processing of thermoplastic material used for applying lines and stripes to a roadway. Heated oil from a burner is directed to a common reservoir having a section for oil distributed to the extremities of the vehicle and a main section for heating of melting kettles; the common reservoir having a divider wall capable of maintaining two different temperatures within the reservoir. A programmable logic controller displays and records the mil thickness of lines that is calculated according to the volume of material consumed at the rate of application based upon the speed of the vehicle.

7 Claims, 13 Drawing Sheets

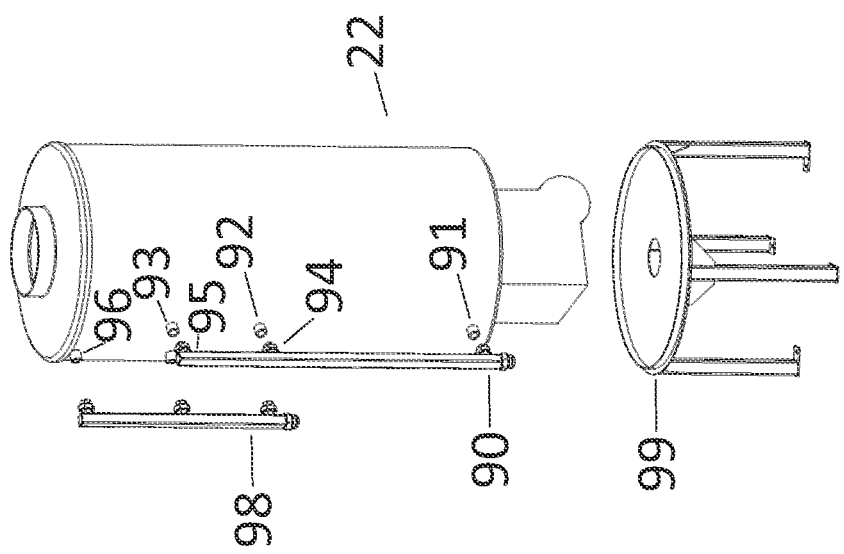

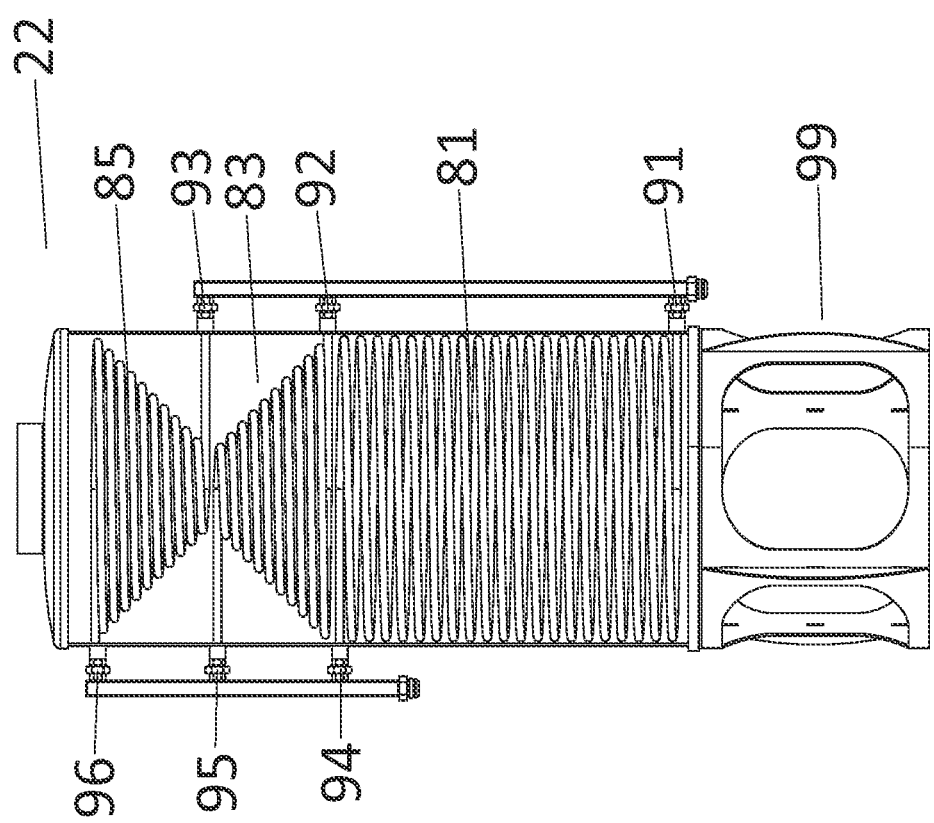

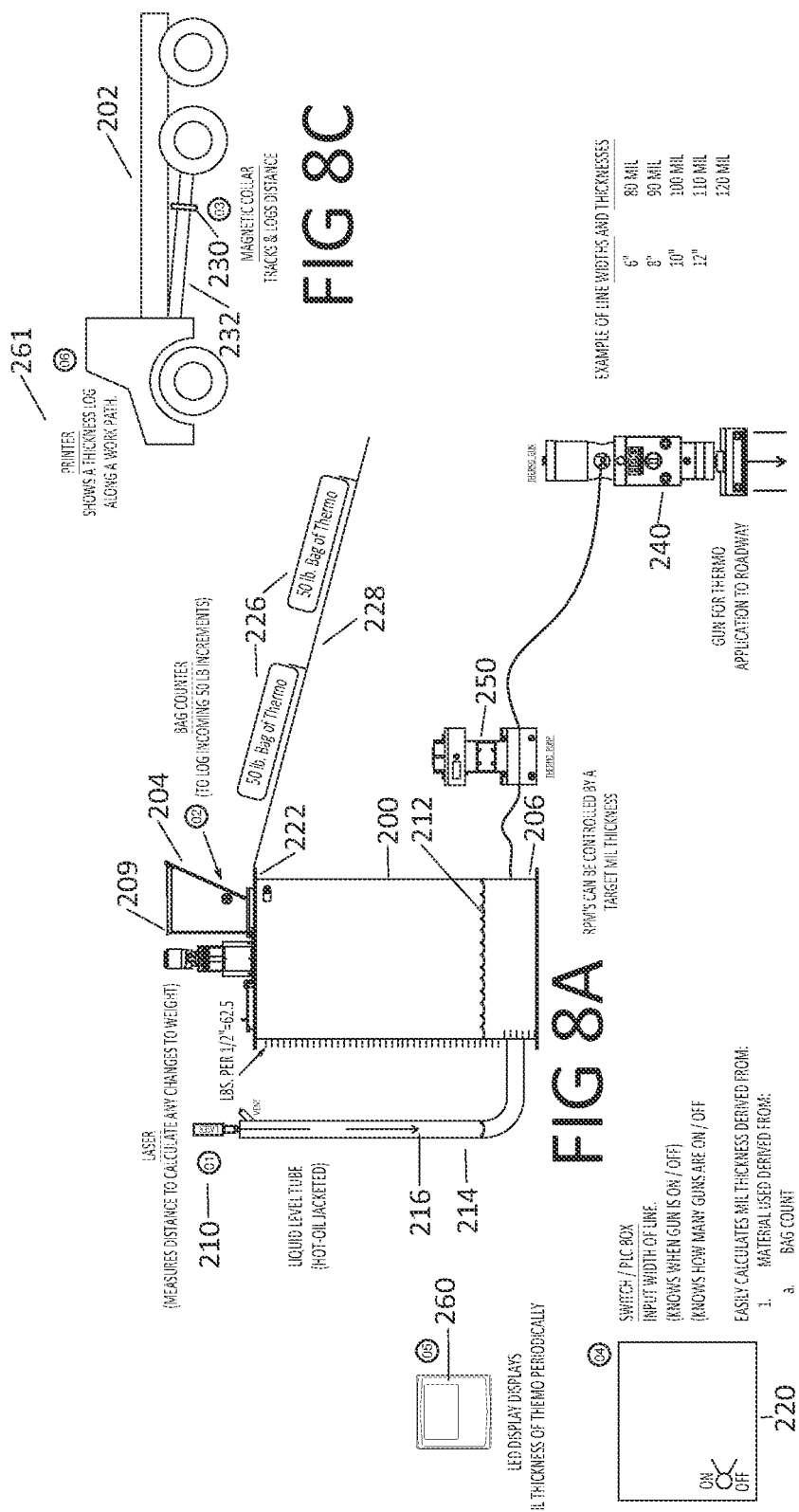

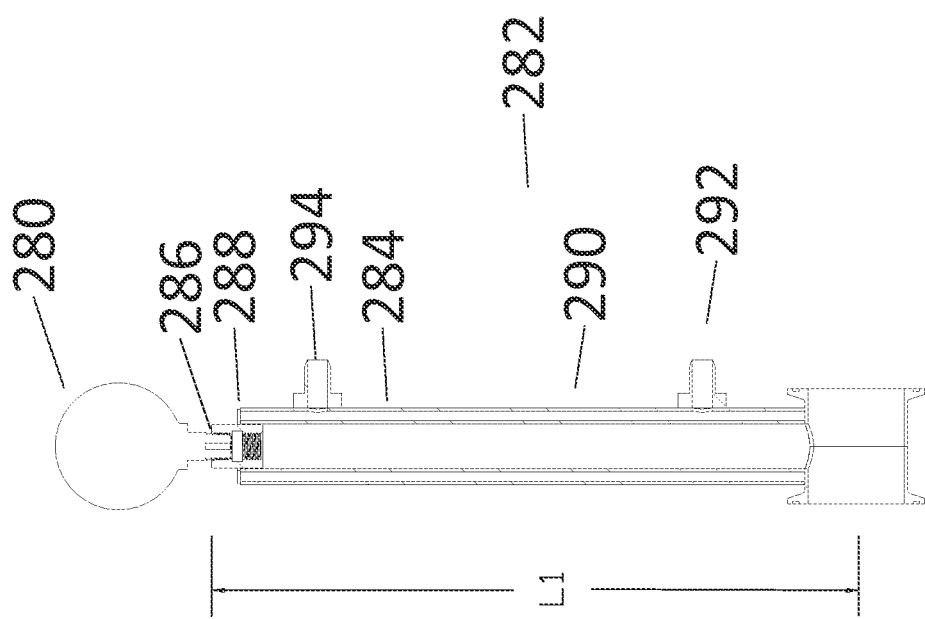

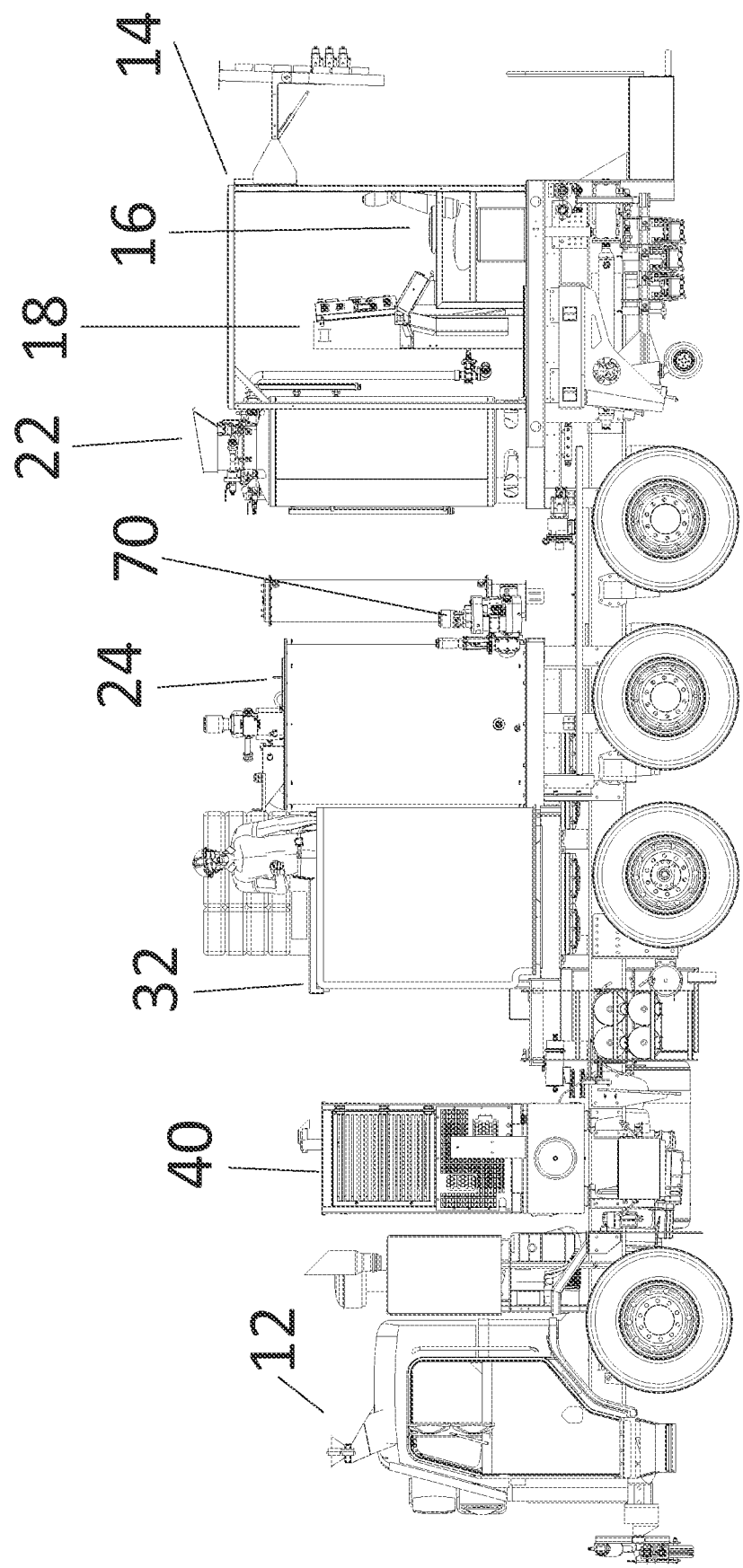

THERMOPLASTIC EXTRUSION MARKINGS

FEDERALLY SPONSORED RESEARCH OR DEVELOPMENT

Not Applicable.

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/944,788, entitled "THERMOPLASTIC EXTRUSION MARKINGS", filed Dec. 6, 2019; the contents of which are incorporated herein by reference.

FIELD OF THE INVENTION

This invention is directed to the field of roadway marking equipment and, in particular, to a vehicle for applying thermoplastic extrusions.

BACKGROUND OF THE INVENTION

Thermoplastic extrusion vehicles are used to melt and deliver molten material to a roadway. The traditional method involves direct fire applied to heating pots of thermoplastic materials which are delivered to the roadway by use of oil jacketed flexible lines, wherein application to the roadway produces a variety of line sizes and profiles. In this method, large pots of thermoplastic material are melted over the course of hours and, once the pots are fully heated, operators apply the material to the roadway as long as material remains in the pots. Material is then added only a little at a time during operation so that the melted material is not cooled down. Conventional pots typically hold enough material for only an hour or two of application time. If additional material is added, the new material takes time to liquefy and come up to temperature. During this time, the material in the pot must recover from the injection of unheated material. Under the conventional method, when the melted material in the pot has been used, the crew must wait hours before another pot is ready for application. Recovery time is an industry term pertaining to the amount of time it takes to melt another load to reach the target temperature of 400° F.

There is an operable temperature, and a temperature at which the application of a thermoplastic strip is not at all workable. Many states require the temperature to be between 400° F. and 425° F. degrees in order for the work to be acceptable. If the material is too hot, the thermoplastic will adhere nicely to the road, but the glass beads that are being sprinkled on top of the material will sink too deeply into the material, rendering them unusable or inadequate for nighttime reflectivity motoring conditions. If the material is too cold, the glass beads will not penetrate at all and the material itself is less likely to adhere to the roadway. Temperature control is very essential to any thermoplastic implementation and glass bead retention.

In a presently preferred embodiment, the thermoplastic mix that is liquefied in a melting pot or kettle is originally in powder form. The mix contains about 40% glass beads for reflectivity and a blend of about 60% plastic elements. When each bag of powdered material enters a melting kettle, it is met with molten material that is already at temperature and being delivered by a pump designed for liquefied thermoplastic material. The pump allows the molten material to flow over the top of the incoming powder. However, the powder will not flow through the heat exchanger tubes that are placed vertically within the melter until and unless it has been converted from the powder form into a liquefied state. It is possible to outpace the top section of the melting kettle. For instance, a melt rate of 8,000 pounds per hour, per color, may consist of a truck having a white melting kettle and a yellow melting kettle. If a crew tries to melt 16,000 total pounds per hour, it is also likely that the burner that heats the oil will not be able to maintain the proper oil temperature.

What is needed in the industry is a device and method for continuous processing of thermoplastic material using a single burner and oil heater having an oil reservoir capable of maintaining a temperature differential of up to 200° F. degrees so that one side can be used for heating the thermoplastic and a second side used to heat the oil jacketed lines for the extremities of the system.

SUMMARY OF THE INVENTION

A thermoplastic extrusion vehicle for continuous processing of thermoplastic material used for applying lines and stripes to a roadway is disclosed. The vehicle employs an improved oil heater having a manifold coupling multiple tubes together, creating a common inlet and a common outlet, as opposed to a high flow directed through a large tube with a single inlet and outlet. The heated oil is directed to a common reservoir having an extremity section for oil distributed to the extremities of the vehicle, and a main section for heating of melting kettles; the common reservoir having a uniquely designed divider wall capable of maintaining two different temperatures within the same reservoir.

A proportional oil pump transfers heated oil into the melting kettle using a programmable logic controller PLC to increase or decrease the speed of the pump according to the target temperature of the thermoplastic. A pump system for the extremities is also used to maintain up to a 200° F. temperature differential of the two sides of the reservoir by incorporating an air actuated high temperature ball valve that is placed in line between the hot oil that comes out of the burner and returns to the common reservoir. The pump system also maintains the temperature of the thermoplastic as it flows through the various pipes and lines. The actuation of this ball valve is controlled via a temperature controller that is able to be set to open or close said valve. The position of this ball valve is placed lower on the common reservoir than the return of the main oil coming from the burner to ensure that the extremities side has priority. By comparison, it is a fairly small amount of oil, and so it tends to heat up very, very quickly. The extremities heat the thermoplastic pumps as well as all of the lines that carry thermoplastic material throughout the vehicle.

An objective of the invention is to teach the use of an oil-based heater having multiple tubes coupled together with a common inlet and a common outlet, allowing for a higher flow rate with a minimal pipe size to optimize the heat transfer from flame to oil.

Still another objective of the invention is to teach the use of the described oil jacketed thermoplastic melter in conjunction with heat exchangers internal or external to the melter in a factory environment where preformed road markings can be mass produced in thin flat sheets, cut into shapes and then applied on roadways using a torch.

Another objective of the invention is to teach the use of a common reservoir that maintains two different temperatures of oil by use of a divider wall.

Still another objective of the invention is to use a single oil tank capable of maintaining a temperature differential of up to 200° F. degrees.

Another objective of the invention is to teach the use of a single burner on a vehicle, as compared with conventional vehicles having up to nine burners.

Still another objective of the invention is to teach a method of forming double walled pipes to carry liquefied plastic and hot oil; the double walled pipe having a small, thin-walled pipe into inside a larger thin-walled pipe. The point of a bend is determined and a plastic rod is inserted around the smaller, thin-walled pipe. The entire assembly can then be bent into position. The plastic material is then removed, via high pressure water and commercially available sanitary fittings having a quick clamp system to allow attachment by hand. Such piping will last for many years and avoids the use of small oil hose wrapped around and around normal piping.

Another objective of the invention is to disclose a system that addresses the laminar flow of oil through tubes known to cause a buildup of material leading to oil flow restriction and eventual possible meltdown of the burner coils. Said system is combined with a pressure sensor and flow sensor to protect a vehicle from a flooded and pressurized burner, which has historically led to many trucks burning to the ground.

Still another objective of the invention is to disclose a system and method for continuous monitoring of melted thermoplastic levels within an oil-jacketed melter.

Another objective of the invention is to disclose a system and method for applying thermoplastic roadway markings at specified thicknesses, whereby confirmation of said mil thickness can be provided to a Department of Transportation to verify the thicknesses of the roadway markings applied to the roads.

Still another objective of the invention is to disclose a system and method for measuring pressure within a thermoplastic line.

Another objective of the present invention is to disclose a thermoplastic melter utilizing mixing blades with hot oil flowing through the blades to increase the surface area of hot oil-jacketed material engaging with the thermoplastic to increase melting efficiency.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 4 is a plane view of an oil heater;
FIG. 5 is a pictorial view of the oil heater depicting triple lines;
FIG. 8A is a schematic view of one embodiment of the system and method for applying thermoplastic markings at specified thicknesses;
FIG. 8B is a schematic view of the computer and LED display used in this embodiment;
FIG. 8C is a schematic view of the vehicle with a driveshaft used in this embodiment;
FIG. 9 is a cross-sectional view of the pressure gauge "T" connector;
FIG. 15 is a side view thereof.

DETAILED DESCRIPTION OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

The instant invention is directed to a device and method of continuous processing of thermoplastic material. A hot oil reservoir is coupled to a burner with a hot oil pump providing recirculation. A thermo melting kettle is coupled to a thermo heat exchanger using a thermo pump.

Figure 1:
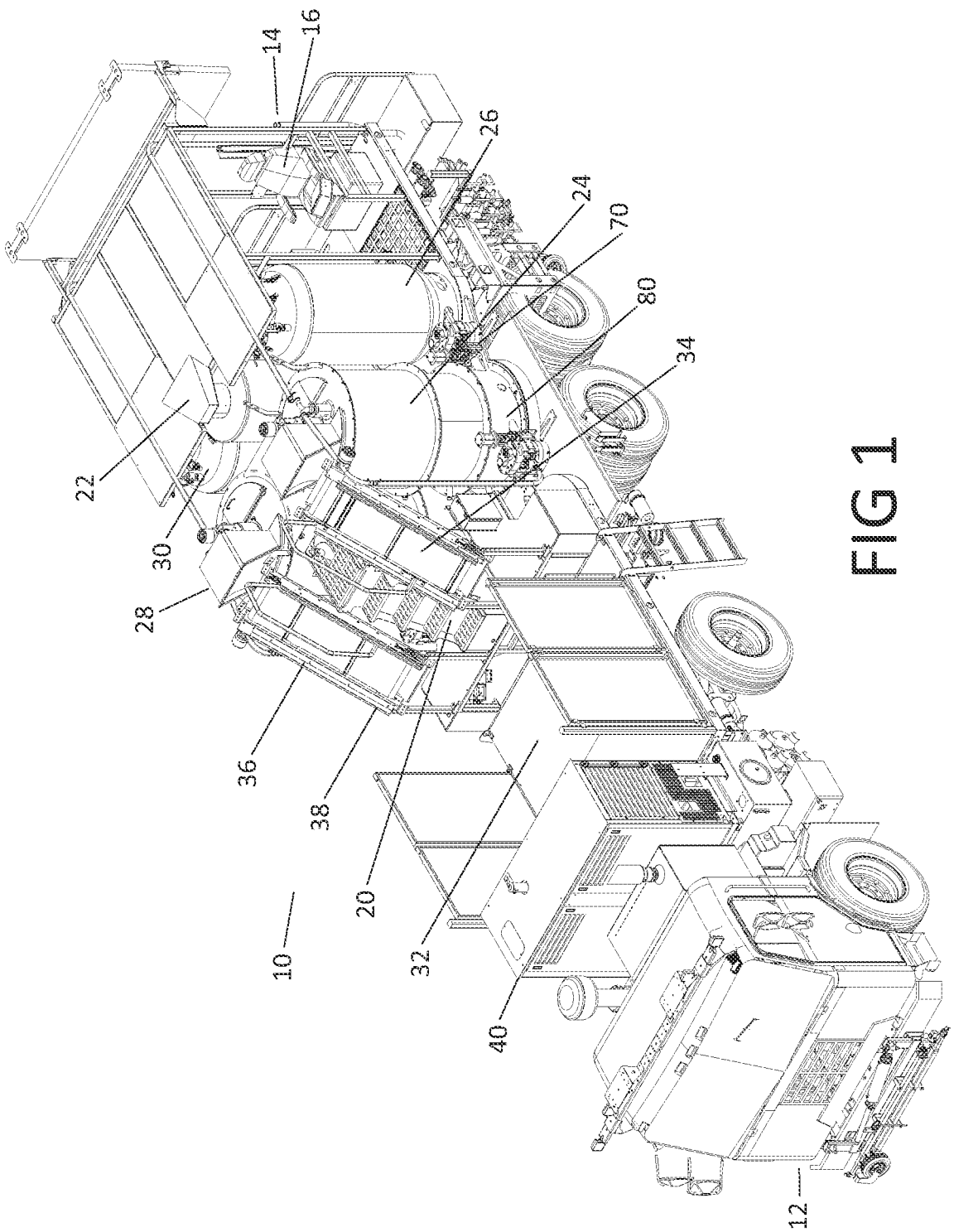
FIG. 1 is a perspective view of the thermoplastic extrusion vehicle with a conveyor lift.
Figure 2:
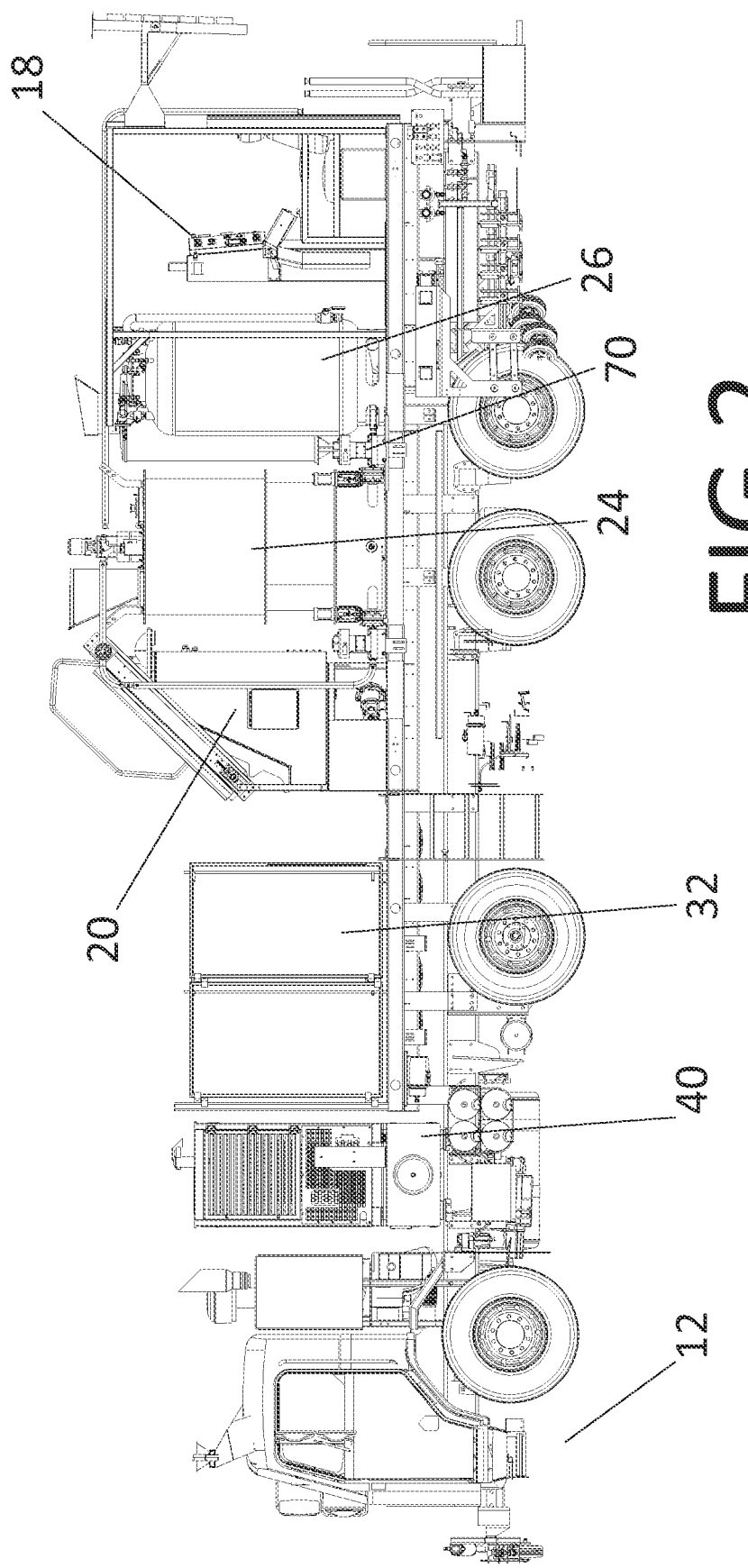
FIG. 2 is a side view thereof.

Referring to FIGS. 1-2, illustrated is the thermoplastic extrusion vehicle 10 having a conveyor 34. This embodiment employs cab 12 at the front of the vehicle for placement of a driver, and a control area 14 located at the rear of the vehicle, wherein an operator has a seat 16 and access to a PLC controller 18. The vehicle 10 includes an main oil reservoir 20 coupled to an oil burner 22, a first color melting kettle assembly 24 and reservoir 26, and a second color melting kettle assembly 28 and reservoir 30. A storage area 32 is used to accept bags of material, which can be loaded into the first melting kettle 24 using a first conveyor 34 or a bulk material loader, and the second melting kettle 28 using a second conveyor 36. The front of the oil tank 20 is angled for receipt of steps 38 and step platform 39, allowing ease of access to the tops of the melting kettles 24 and 28. A power generator 40 is mounted behind the cab 12.

Figure 3:
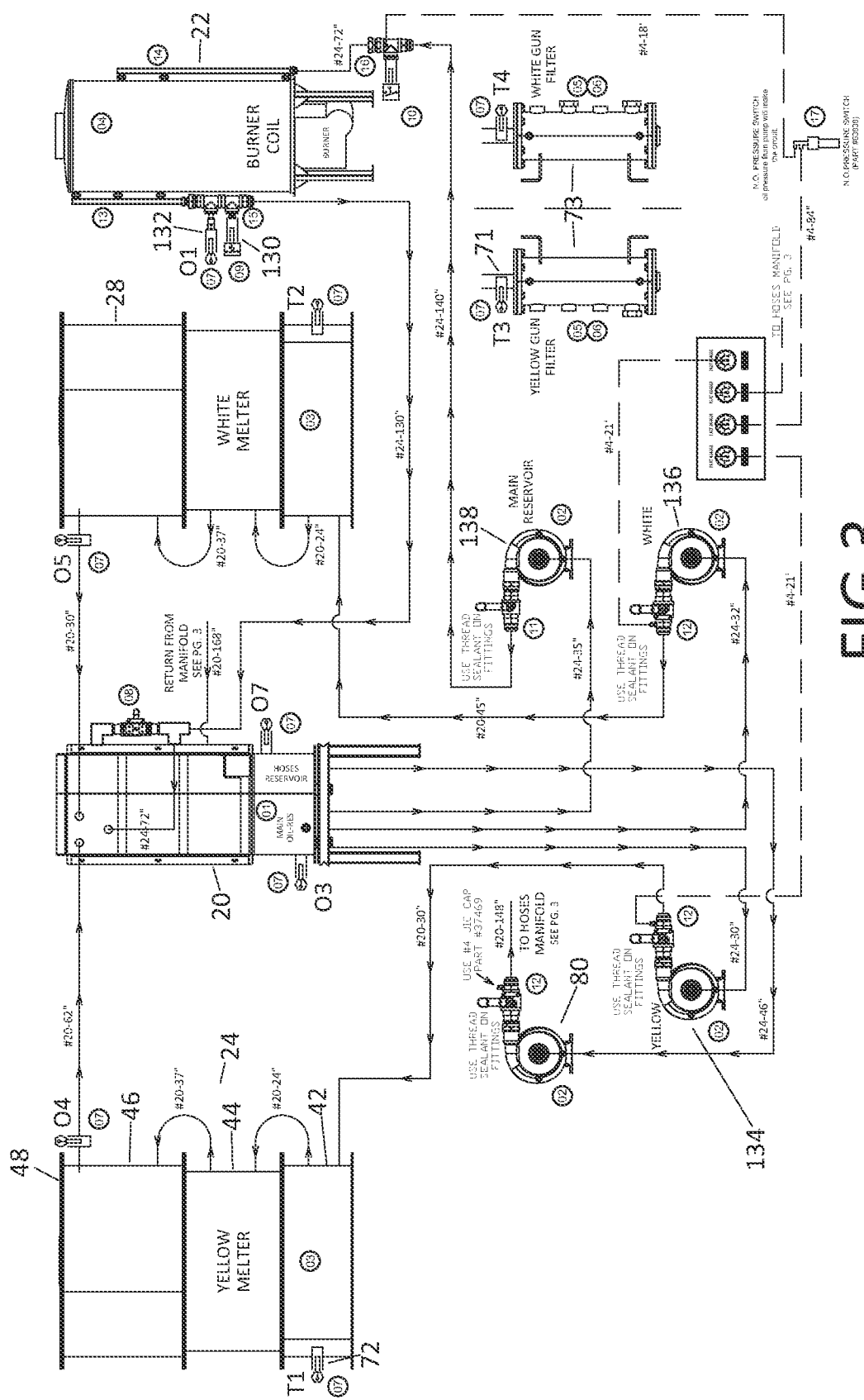
FIG. 3 is a flow diagram of an oil recirculation system.

Referring to FIG. 3, illustrated is one embodiment depicting hydraulics for a melter system. A melting kettle assembly 24 includes a bottom section 42, a middle section 44, and a top section 46 for receipt of an oil jacket, described later in this specification. An inlet feed assembly 48 allows access to the top section 46, with material preferably delivered by the conveyor or manual bulk loading. The top section 46 has a mixer that is rotated by a motor assembly, not shown. To control the temperature of the plastic, a first temperature probe 72 extends into the bottom section 42 of the melting kettle, and a second temperature probe 71 is placed by the guns 73, just prior to a filter before entering the guns. Both of these temperature probes 71, 72 are designed to monitor the temperature of the plastic itself to prevent overheating of the plastic. The two aforementioned probes are connected to a PLC controller having data points which can be modified by the operator. The first data point is the low setting, the second data point is the target setting, and the third data point is the high setting. The PLC controller 18 is connected to a proportional hydraulic valve that controls the speed of hot oil delivered from a main reservoir 20 into the melting kettle 24 oil jacket or heat exchanger. If the temperature reading from the thermoplastic probe temperature is below the low set-point on the PLC, the hot oil pump will run at the maximum speed permissible by the full opening position of the proportional control. If the target temperature has been reached, the pump will slow to the input percentage. For instance, if 50% of the full potential of the hot oil pump speed is used, the hot oil pump will continually deliver oil from the main reservoir into the melting device; 50% speed is significantly slower than 100% speed. Next, if the high temperature has been reached, then the hot oil pump will slow down and actually come to a stop. If the hot oil pump stops delivering hot oil out of the common reservoir into the melting kettle and heat exchanger, the plastic will begin to drop in temperature.

The oil recirculation diagram of the disclosed system depicting the first melting kettle 24, which may include yellow material for roadway markings, and the second melting kettle 28, which may include white material for roadway markings, are both fed by heated oil from the burner 22. The burner 22 includes a flow switch 130 and a temperature switch 132 to check flow and temperature from the oil leaving the burner 22 and entering the reservoir 20. The reservoir 20 has a first recirculation pump 134 to draw from the reservoir 20, providing heated oil to the first melting kettle 24; the oil cascading upward through the sections before returning to the top of the reservoir 20. Similarly, the reservoir 20 has a second recirculation pump 136 to draw from the reservoir 20, providing heated oil to the second melting kettle 28; the oil cascading upward through the sections before returning to the top of the reservoir 20. The main recirculation pump 138 operates continuously and draws from the reservoir 20 for delivery to the burner 22. A proportional pump 80 draws from the reservoir 20 for an adjustable flow to the hoses and manifold.

To transfer liquefied thermoplastic, insulated hoses or piping is required. Double-walled hoses are very expensive and have a long lead time associated with them. Additionally, double-walled hoses cannot be moved when thermoplastic material has cooled on the inside walls. This corrugated flexible piping can easily break, allowing the oil from the hot oil side to spill over into the plastic side, and requiring immediate replacement. Because of the many pipes that need to exist on a thermoplastic vehicle, what is needed is a better system for delivering liquefied thermoplastic to the various points of the vehicle via a double-walled piping system. In a preferred embodiment, a small, thin-walled pipe is inserted into a larger thin-walled pipe. The point of a bend is determined and a plastic rod is inserted around the smaller thin-walled pipe. The entire assembly can then be bent in position. When the bend radius is achieved, the piece of plastic and the inside pipe has prevented the outer pipe from collapsing during the bend. The ends of the pipe are welded on the ends of each of the pipes, and the holes are drilled in order for the hot oil to surround the inner pipe to carry the thermoplastic without the two of them mixing. The plastic material is then removed by application of high pressure air. Fittings are commercially available sanitary fittings that have a quick clamp system that can be easily tightened by hand. This clamping system allows for easy minor adjustments and easy replacement of any ball valves or any pumps that eventually may need to be replaced in the system. Competitors in the industry are using NPT fittings. Of course, when these fittings become contaminated with plastic and that plastic hardens, they are very difficult, if not impossible, to remove and replace the various components attached to them.

The process requires less than half of the kettles normally employed on a truck, leaving space for other devices, such as the conveyor belts 34 and 36 and or a bulk loader that enables the semi-automated loading of 50-pound bags of material or bulk loading of plastic.

In an alternative embodiment, an external heat exchanger can be used to exchange heat from oil to plastic. Prior heat exchangers have heated oil that enters the bottom section of a heat exchanger, where the oil immediately begins losing its temperature. The middle of the heat exchanger reaches 500° F. degrees and contains the greatest number of square feet, and thereby will realize the greatest amount of temperature loss through the exchanger module. As the temperature of the oil drops, so will the heat exchange rate. An external heat exchanger reduces this negative dynamic. In this embodiment, the heat exchanger is comprised of between one and six hundred lengths of a heat exchanger pipe. There are six to eight ½-inch thin-walled pipes traveling through a 2-inch pipe, and both ends are secured to a manifold in such a way that oil surrounds the plurality of ½-inch tubing and thermoplastic travels through the ½-inch tubing. For example, using a 2-inch pipe that is 6-foot in length, thermoplastic enters six or eight of these pipes and travels through the ½-inch pipe from one end and 6 feet to the other end; at which time that thermoplastic travels through a 180 pipe or directly into a manifold, and or enters another 6-foot length of the 2-inch pipe established in exactly the same configuration. In the same way, the thermoplastic travels back and forth between 6-foot lengths of this 2-inch piping containing these ½-inch pipes.

In an alternative configuration, a manifold delivers thermoplastic to between two and twenty sections of the heat exchanger. The outlets of each of the heat exchangers can flow back into the matter individually, or can be manifolded at the outlet to form a single outlet back into the melting kettle. The hot oil circuit comes from a 1½-inch pipe and comes into a manifold that is at least 1½-inch in diameter and has a corresponding number of outlets to the 6-foot pipe lengths. Assuming the hot oil is at constant 550° F., all of the 6-foot pipe lengths will have access to 550° F. oil at the beginning of the heat exchange process along the 6-foot length. When the hot oil leaves each 6-foot length, it will enter a return manifold that returns it back to the common reservoir. This provides a more efficient heat transfer process by presenting 550° F. oil to more square footage of plastic than is currently possible by presenting 550° F. oil at the beginning of the process and having only 440° F. oil available at the end of the process.

A diesel fired burner 22, illustrated in FIGS. 4 and 5, is used to heat a cavity in which multiple tubes are filled with oil and used to transfer oil between the cavity and the kettles. Conventional burner systems employed a flow rate of about 30 gallons a minute due to the inability of hot oil pumps to push oil through small diameter tubes. While an increase in the size of the tube allows the higher passage of oil, the increase in pipe size causes the heat transfer efficiencies to be diminished. If the flow is increased, the heat transfer efficiencies decreases. The above problem is solved by using a burner 22 having an inlet manifold 90 coupling multiple tubes 91, 92, 93 together with outlets 94, 95, 96 coupled to a common outlet 98, wherein the burner flame is directed to the same tubing between tube 91 and exit 94, tube 92 and exit 95, and tube 93 and exit 96. Tubing 81 between inlet 91 and outlet 94 are spaced apart as shown. Tubing 83 is coiled from an outer ring to an inner ring, shown in an expanded position for illustration only. Tubing 84 is coiled from an inner right to an outer ring, shown in an expanded position for illustration only. The burner 22 is placed on a support 99 above the deck of the truck bed. A suitable size of tubing is around three-quarter inch tubes, which are a few hundred feet in length each, not shown. This process of using a manifold with multiple tubes in favor of high flow and high heat transfer efficiency with a common inlet and a common outlet. Once the oil exits the heater, there are two safety valves that prevent the overheating of the oil. One safety valve is a temperature probe designed to turn the burner on and off with a maximum temperature setting. The other safety valve is a flow sensor which is novel in its application to a thermoplastic vehicle.

Figure 7:
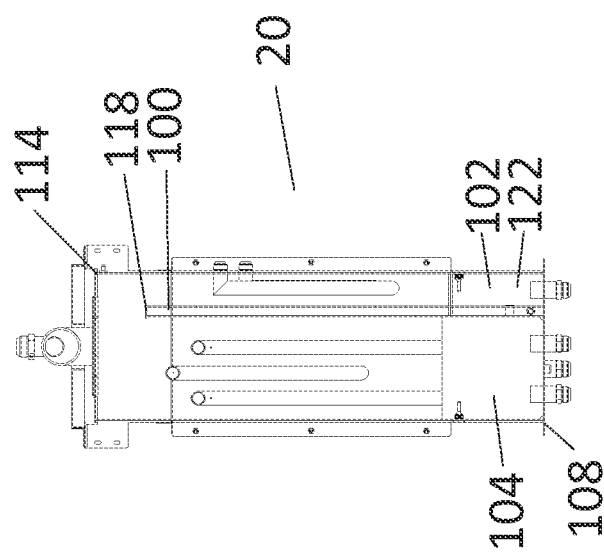
FIG. 7 is a cross-sectional view of the shaped oil reservoir.
Figure 6:
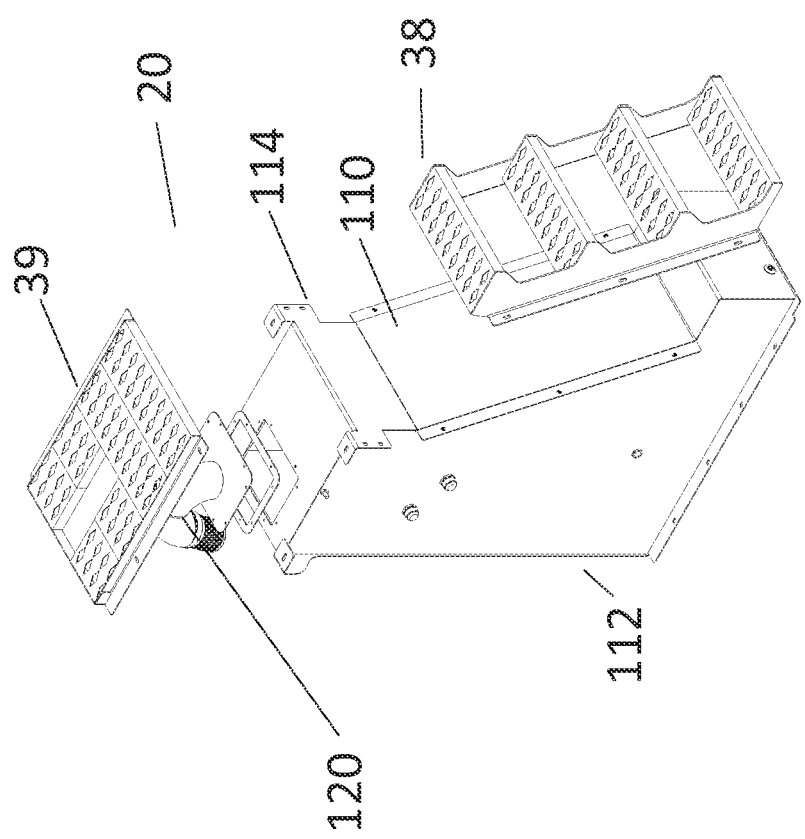
FIG. 6 is a perspective view of a shaped oil reservoir.

Referring to FIGS. 6 and 7, after exiting the burner, the heated oil can be directed to a main reservoir 20 which may be of different shapes. In this embodiment, the reservoir 20 is shaped so as to allow the placement of steps 38, wherein the reservoir is placed in a position that is otherwise open space. Heated oil expands at a rate of about 30% when it arrives at full temperature and cannot be pressurized. In one embodiment, the common reservoir 20 has an internally insulated divider wall 100 forming two sections; extremity section 102 that holds oil stored for the purpose of heating the extremities of the vehicle, and the main section 104 of the tank that is used to heat the melting kettles. The common reservoir 20 can maintain two different temperatures of oil by use of the divider wall 100. The divider wall 100 extends from the floor 108 and is connected with the front wall 110 and the rear wall 112, but stops short of the ceiling 114 of the reservoir. Having space between the ceiling 114 of the reservoir and the top 118 of the divider wall 100 allows the oil to spill from either the main section 104 into the extremity section 102 or from the extremity section 102 to the main section 104. Both sections 102, 104 are connected to a large overflow pipe that is essentially a U-shaped pipe 120 connected to the cavity on top of the tank, and operates as an emergency relief with the exhaust of the pipe directed to the roadway. The pipe 120 is preferably a 4-inch overflow that allows for any expansion to dump out onto the roadway or drain pan without restriction.

The divider wall 100 includes an aperture 122 approximately 6 inches up from the floor 108 that leads from the main cavity 104 to the extremity cavity 102. This aperture 122 is calculated to allow fluids to equalize between the extremity cavity 102 and the main cavity 104, but the aperture 122 is not large enough to allow heat to transfer between the two sections. The common reservoir 20 can maintain a temperature differential of up to 200° F. Hot oil heating is used to control the temperature of the thermoplastic to a desired setting; the hot oil pump 70 sucking oil out of the common reservoir 20, pumping it through a heater, and delivering it back to the common reservoir. This main hot oil pump never shuts off, and delivers oil to the burner whether the burner is on or off. A main reservoir heating circuit is controlled by a solo controller that monitors the temperature on the outlet side of the burner; and when it gets too high, shuts the burner off. When the temperature drops down below a preset temperature, the burner turns back on. The purpose of the circuit is to keep the main reservoir at a consistent temperature at around 550° F. A hot oil pump transfers oil out of the main reservoir and into each melting device. The speed of this hot oil pump 70 is controlled by a PLC controller 18 and increases or decreases according to the target temperature of the thermoplastic. The extremities pumping is used to maintain up to a 200° F. differential in the temperature of the two sides of the common reservoir by incorporating an air actuated high temperature ball valve that is placed in line between the hot oil hose that comes out of the burner and goes back into the common reservoir. The actuation of this ball valve is controlled via a solo temperature control that is able to be set with a high temperature. The position of this ball valve is placed lower on the common reservoir than the return of the main oil coming from the burner. Therefore, when the oil exits the burner, the hose goes low, towards the bed of the truck, and comes back up and attaches to a T-fitting. Exiting the T-fitting is one hose that goes directly to a ball valve; and, if that ball valve is open, goes into the extremities side for the heating of the hoses, circuit, and the extremities. Oil can still go into the main side of the tank, but it would have to travel nearly a foot higher in order to arrive at the inlet for the main side of this reservoir. This ensures that the extremities side always gets the priority. By comparison, it is a fairly small amount of oil and so it tends to heat up very, very quickly. The extremities heat the thermoplastic pumps as well as all of the lines that carry thermoplastic material throughout the vehicle.

As previously stated, the temperature of the thermoplastic in a melting kettle is adjusted by a controller coupled to two temperature probes; one in the very bottom section of the melting kettles, and one prior to the filter that leads to the distribution guns. The target temperature is the temperature at which the material is exiting the guns, not necessarily the temperature at the bottom of the melting kettle. When an operator dispenses large amounts of material, the temperature in the bottom of the melting kettle drain needs to read somewhat higher than the temperature at the gun. The speed of the hot oil pump is controlled by either a probe at the bottom of the melting kettle or the probe just prior to the filter. When the operator has the white side or yellow side gun open, the control for the hot oil pump switches to the probe at the filter rather than the probe at the melting kettle. The probe at the filter will always read some degrees cooler than the probe at the melting kettle. The moment you begin using material, the oil pump comes on and maintains temperature. A third control is a manual control that turns the oil pump on and leaves it on until that manual control is shut off. This would be used in cases where the operator knows that there is a long section of double yellow high mileage line coming up and wants to superheat the material in order to accommodate large amounts of incoming cold plastic. In this way, the operator can artificially control the speed of the hot oil pump.

The following description outlines a methodology for documenting the mil thickness of thermoplastic lines applied to highways. The "mil thickness" is an industry term denoting thickness in increments of one thousandth of an inch. Currently there is no system in the industry to measure and document the thickness of roadway markings that are applied. Departments of Transportation across the USA have expressed great interest in the ability to document the thickness of line being applied in order to establish the value of work performed. For instance, the Department of Transportation would normally pay nearly twice the price for a 120-mil line as they would for a 60-mil line. Material is a very expensive component of work performed, so it is important to establish that the state receives what is requested and the thickness is verifiable.

Attempts to address this issue have included the installation of weight scales beneath the thermoplastic kettles, wherein the volume of thermoplastic exiting the kettle and the thickness can be calculated based on the decrease in weight within the kettle. Such methods, however, do not accommodate for, and cannot account for, the continual input of new material being added to the melter. Adding additional material to the melter while the vehicle is operating is important for efficiency of the vehicle because of the time it takes to melt the raw material before it is sufficiently melted to be capable of being applied to the roadway.

Therefore, adequately addressing this problem requires a system and method that addresses the regular or continuous addition of new materials added into the melter and calculates the material that is outgoing.

Though various embodiments of the design are herein contemplated, the present embodiment, as shown in FIG. 8, includes first a system and method to measure the liquid level in the melter reservoir, i.e., the portion containing the approximately 400° F. molten thermoplastic. Second, a counter 209 can be employed at the top inlet of the melter to count and relay a signal when a bag of raw thermoplastic materials is added to the melter. Industry standard bags are 50 pounds, but the system can be adapted to accommodate other weight bags or bulk loading as necessary. Third, a magnetic collar 230 around the truck's drive shaft calculates the precise distance traveled by the vehicle. Fourth, a computer 220 is currently employed for precise monitoring over the functioning of the thermoplastic gun that delivers the material to the roadway. Based on the input of line width of the lines being applied, the liquid level of melted material, the number of bags of raw material that are added to the melter, and the distance traveled in which the guns are open the system, one can easily periodically determine what the mil thickness of line was.

Referring to FIGS. 8A-8C, illustrated is a system for measuring applied line thickness in a thermoplastic extrusion vehicle. The system is based upon a melter reservoir 200 secured to a vehicle 202 having an inlet 204 and an outlet 206. A laser 210 is used to detect the level of thermoplastic material 212 in the melter reservoir 200. In a preferred embodiment, the laser 210 measures the level in a liquid level tube 214 to avoid interference from mixers commonly placed within the melter reservoir 200. The liquid level tube 214 is oil jacketed 216 to maintain the thermoplastic material within the liquid level tube, or indicator, 214 at the same temperature of the thermoplastic material 212 within the melter reservoir 200. A computer 220 having a microprocessor is coupled to the laser 210 for calculating the amount of thermoplastic material in the melter reservoir 200 based upon the level of thermoplastic material 212 detected. A counter 222 may be positioned at the inlet 204 to the melter 200 for counting bags 226 of raw thermoplastic material that are added to the melter 200 using the conveyor belt or manually using the sensor counter 209. The bags 226 may be carried by a conveyor belt 228 or inserted manually. Industry standards consist of 50 pound bags, and the computer would count each bag added as a 50 pound addition to the thermoplastic material 212. It should be noted that while 50 pound bags are industry standard, bags of higher or lower amounts may be used and the computer 220 adjusted accordingly.

A magnetic collar 230 is attached to the drive shaft 232 of a vehicle 202, and further coupled to the computer 220. The magnetic collar 230 is used to track and log the precise distance traveled by the vehicle 202. A gun 240 is used for application of the thermoplastic material; the gun 240 having a predetermined width, such as 6", 8", 10" or 12". The flow of the thermoplastic material is through a pump 250 which provides a flow rate to meet a mil thickness for the width. For instance, a desired mil thickness may be 80, 90, 100, 110, or 120 mils, wherein the system can apply the required mil thickness and measure it. Alternatively, the rpm's of the motor can be controlled by targeting a mil thickness. The mil thickness can be periodically displayed on a monitor 260, saved on the computer 220 for verification, or output as a paper printout using a printer 261.

Upon starting operations for the day, the liquid level indicator 214 would be zeroed to establish the starting liquid level. In most cases, the melter reservoir would be full prior to beginning operations on a given day. A fifth aspect of the present embodiment would be an LED or other digital numeric display 260, upon which the computer would periodically display the mil thickness of the line being applied. In addition to a digital display 260 that would periodically indicate to the operator whether or not the line thickness was within spec. A printer can also be employed within the truck's cab to print out a thickness plot along a given linear path, specifying the number of mils of line applied along that route, and thus verifying the work performed.

For instance, if the job consisted of 80,000 feet for a given day, the computer could automatically populate 80 points on a graph, and each of those points would indicate the mil thickness average measurement taken at each 1,000-foot waypoint. The computer could also calculate the average mil thickness for the entire day or for any segment of that 80,000-foot area. The computer is also designed to monitor variables, such as material temperature, and add those variables to the list of data points. The material temperature is presently calculable through what is known in the art as a data logging system. What is missing from the known data logging systems, however, is the subject of this current invention, i.e., the ability to track and log the mil thicknesses of applied thermoplastic material along a given pathway.

Additionally, by incorporating GPS to the present invention, such a system could also plot mil thicknesses applied along a given section of roadway, and could print out an aerial map showing the applied thicknesses in the geographic locations.

To be used either independently or as part of the above described system and method for applying thermoplastic lines as specified thicknesses, the following device can be employed for continual remote monitoring of the liquid level in a thermoplastic kettle used to store molten plastic for application on roadways, highways and runways.

Getting up and down from a truck during operation is dangerous and has resulted in accidents when individuals checking the liquid level within a melter by looking in from the top have gotten hit by a bridge, power line, tree, or the like. Therefore, a device to monitor and measure the liquid level has been needed in the art, but has proven difficult to accomplish because the plastic is very hard when it's cool, but extremely hot when it's melted and ready for application.

The following device provides an oil-jacketed liquid level indicator 214 connected to the hot oil-jacketed thermoplastic melter 200 to measure the volume changes in the thermoplastic melter 200. The measurement column 214 comes off the bottom of the melter with an oil jacketed line 216 between 1-inch and 4-inches in diameter. The oil jacket keeps the thermoplastic inside the measurement column 214 hot so that it moves up and down the column in response to the changing thermoplastic 212 liquid level within the melter's main reservoir 200. Utilizing a separate column to measure volumetric changes within the main reservoir insulates the liquid level within the measurement column from height disturbance within the main reservoir, which can be caused by such things as the movement of the agitator within the melter, by incoming bags of the raw materials which have not yet melted, from clumping of partially melted thermoplastic within the melter, and the like. Between these disturbances, such as the clumps formed from the bags in the agitator, the agitator, and the bags of raw materials being added, trying to measure the liquid level inside the main melter has proven difficult to impossible.

At the top of the measurement column a vent is included so that pressure buildup within the column does not restrain the material within the column 214 from rising in response to the addition of material within the melter. In one embodiment, as shown within the system in FIG. 8A, a laser 210 measures the distance from the top of the column 214 to the top of the thermoplastic within the column. Using an electronic form of measurement, the laser or an ultrasonic sensor reading the distance allows the measurements to be connected to the computer so that the volume can be calculated. A display within the vehicle 202 allows the operator to continually monitor the volume of thermoplastic within the melter, and allow the measurements to be incorporated into the above-described system and method for applying markings at specified thicknesses.

Referring to FIG. 9, another aspect of the present invention is a device that can monitor and indicate the pressure produced by a thermoplastic pump or connected circuitry. Inserting a pressure gauge in a line will not work because the molten thermoplastic is too thick/viscous, and the glass beads within the molten thermoplastic create mechanical interference with the proper functioning of the gauge movement. The present invention represents a significant innovation into monitoring thermoplastic pressure, which is important for producing a quality thermoplastic road line. The thickness of the road line is directly impacted by the internal pressure and, up until now, no device exists for monitoring such pressure. In a simple embodiment of the present invention, a standard pressure gauge 280 can be used with an oil-jacketed "T" connector 282, where the pressure gauge is attached to the vertical extension 284 of the "T" connector 282, positioned so that the "T" extends in a vertical direction.

The dimensions of the "T" connector 282 must provide for sufficient vertical length L1 to prevent any molten thermoplastic which enters from reaching the inlet 286 of the pressure gauge 280. An oil jacket 290 has an inlet 292 and an outlet 294. Because the connector does not include a vent for gas to escape, the pressure gauge 280 may be safely coupled at the top 288 of the "T" connector 282 without any risk of the thermoplastic reaching it. Alternatively, a hose can be attached to the top of the "T" and the pressure gauge can be placed on the other end of the hose and located at any desired location. One such desired location could be in a control console or a PLC display where a vehicle operator typically looks to monitor the operational conditions of the vehicle.

Figure 11:
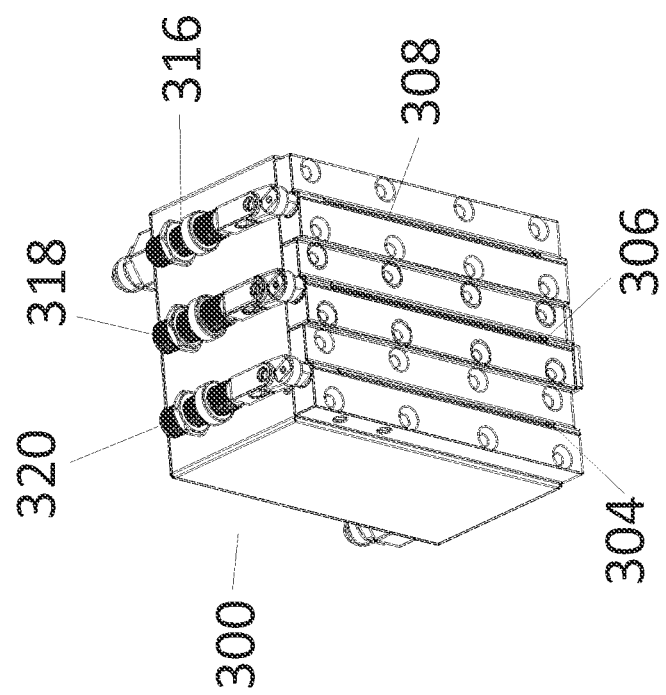
FIG. 11 is a perspective view of the gun.
Figure 10:
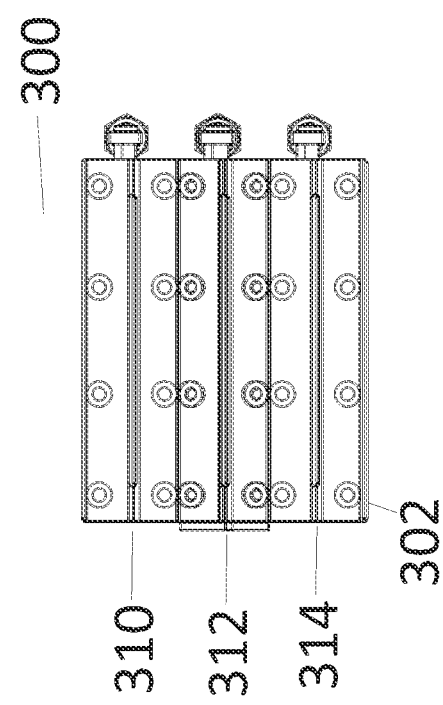
FIG. 10 is a front view of a rotary valve gun assembly and nozzle for controlling line width.

Referring to FIGS. 10 and 11, for application of the heated material, a thermoplastic gun 300 is employed. Currently, thermoplastic guns have a few things in common. All of them are opened and closed via an air or hydraulic cylinder that lifts or lowers a knife, essentially which makes contact with a small opening and either stops or opens the flow of thermoplastic traveling to the roadway to make up the line. This configuration presents the following problems: First, there are moving parts inside of the thermoplastic housing. The cavity in which the parts move must be oil jacketed in order to keep the plastic very hot when the knife opens, allowing the thermoplastic to exit at the beginning of the line. When the knife closes at the end of a line, it also forces more material out of the line because it must displace the plastic that is filling the heated cavity on its way to closure. Further, traffic markings vary greatly in widths. There are 4-inch markings, 6-inch markings, 8-inch markings and 12-inch markings. The need to switch between widths has long been a problem. Many manufacturers simply recommend keeping a gun that has the desired configuration already set up rather than trying to switch widths. The recommendation is to just switch the entire gun and keep the various configurations on hand. However, connecting and disconnecting thermoplastic lines is laborious and time-consuming. When the lines are hot, the lines are easy to move, but it is also dangerous and very inconvenient as one is easily burned when doing this task. When the lines are cold, you run the risk of breaking the corrugated interlining of these hoses. Therefore, moving the lines cold or moving the lines hot, either way, is difficult with inherent dangers. Other manufacturers have recommended putting a 12-inch head on the gun and then simply using mechanical interrupters positioned at the bottom of the 12-inch housing in order to block the flow to the desired line widths. However, you can imagine when doing a 4-inch line, how much more pronounced the starts and stops are because the 12-inch blade is rising and lowering with the associated displacement created, and the starts and stops look all the more atrocious.

A thermoplastic line laying gun 300 of the instant invention has no internal moving parts whatsoever. The invention describes a box which is heated on all sides 302. The jacketed sides provide heating to any plastic that will be inside of it. The width of the line is produced via a round rod 304, 306, 308 with a carved out section the length of the desired line width. The length of each slit 310, 312, 314 will have exact correlation to the width of line intended to be produced. In other words, a 4-inch line will have a rod with a 4-inch carved portion. An 8-inch line will have an 8-inch carved portion, etc. In one embodiment, this heated cavity contains four round rods on the bottom of it. Because each round rod has a slit in it, and itself has a slit the entire length, when the rod is rotated and the carved portion comes in alignment with the corresponding slit, the thermoplastic flows to the road according to the width of the carved portion. When the rod rotates in the closed position, the flow of thermoplastic of course stops. Each round rod exits just enough to allow the connection of an air cylinder 316, 318 or 320 that opens or slowly rotates the rod in the open and closed position. A person striping the roadway can choose the size of line with a single cavity, with no internal moving parts and with no change of displacement inside the cavity, thus the starts and stops are unaffected by the opening and closing. The rods are sealed on each end with a small piece of packing, although metal on metal may also work because the plastic is of a certain thickness; there is no leakage even without packing material present. Additionally, multiple colors can be used within the same gun housing.

Figure 12:
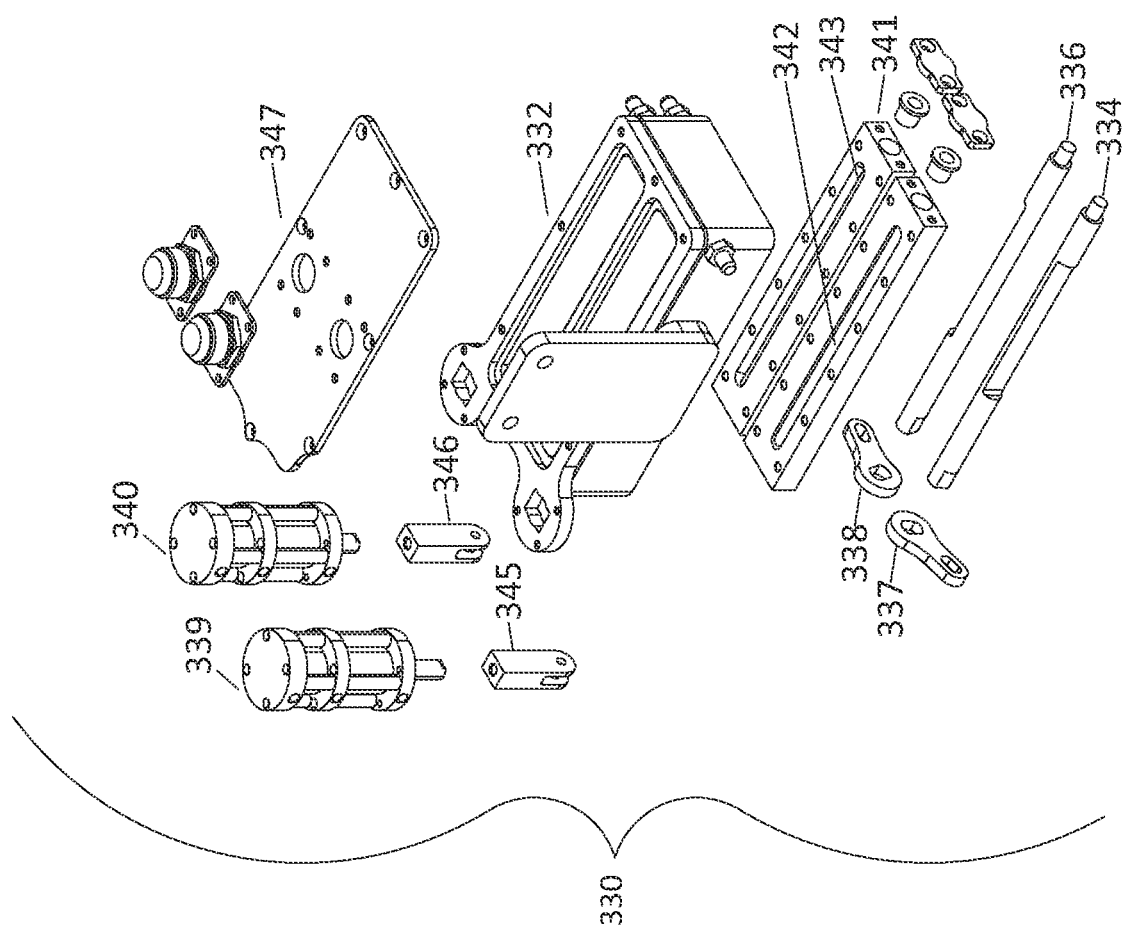
FIG. 12 is an exploded view of a two line gun.

FIG. 12 illustrates a ribbon gun 330 having a body 332 with rotary pins 334, 336 each operated by levers 337, 338 by air actuators 339, 340 with connectors 345, 346. The rotary pins 334, 336 are rotatably coupled to plate 341 having slits 342 and 343. End plate 347 is coupled to the body 332.

Figure 13:
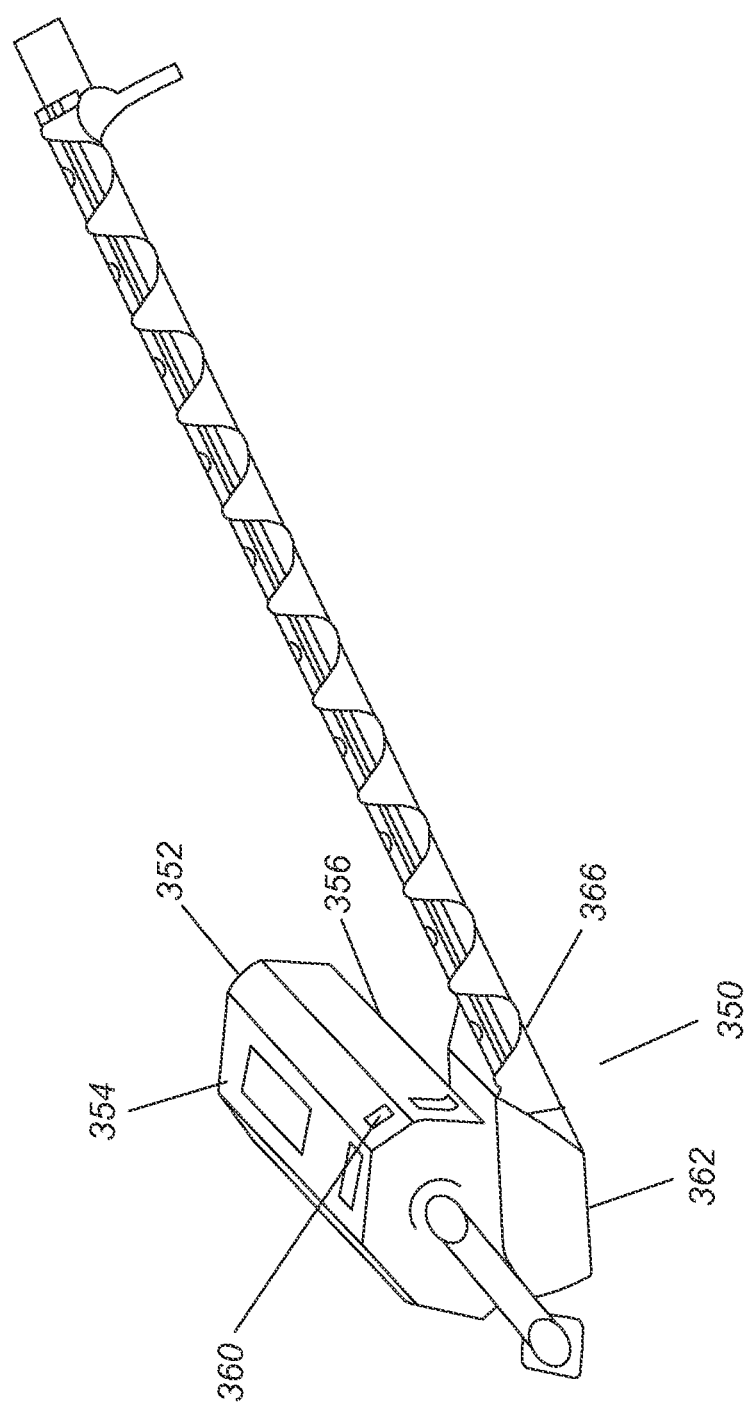
FIG. 13 is a perspective view of a bulk material loader for transferring bulk material to the melter.

Referring to FIG. 13, illustrated is a bulk loading system which consists of a rotating drum 352 made of a hexagon type profile. The drum shape causes material to fall over itself during rotation. Once the material has arrived at the top 354 of the drum, it falls to the bottom 356. Falling material hits the bottom of the drum, which causes material to dislodge from the drum side wall, and allows a further breakup of the material. The rotating drum 352 eliminates the need for a friction inducing component, which would otherwise lead to heat buildup and cause plastic to melt around the moving devices, which leads to clogging. A rotating octagon shape does not create any friction, and the material will simply fall upon itself and break apart. The mixer drum is also tilted so that mixed debris will eventually fall to the front side where slotted holes 360 around the radius of the drum allow the material to fall into a shoot 362 that leads to an augur or conveyor 366. The augur or conveyor 366 will carry material from behind the cab of the truck up an incline and eventually lead into the top of a melting device. An inclined or horizontally disposed augur avoids the friction caused by straight up vertical transfer which causes material to melt between the rotating augur and the sides of the augur tube rotating within. The hex drum 352 allows for bulk bags to be loaded into the rotating drum, eliminating the manual effort of bag replenishment.

In another embodiment of the oil jacketed thermoplastic melter with thermoplastic pump, as described above, the melter can be adapted to operate at a stationary facility to produce thermoplastic molds which can be taken to a road site and applied with a heating torch.

As described above, the melter includes a pump that pumps material through a heat exchanger in order to rapidly accelerate the heat transfer from fire into the thermoplastic. This same melter with pump for rapid heat exchange can be used in a stationary in-plant application, where large quantities of thermoplastic are melted in an oil jacketed kettle.

Upon mixing a variety of materials into an admixture suitable for use on highways, white and yellow thermoplastic colors, as well as a variety of other colors, are used in order to place instructive and decorative markings on highways, parking lots, and the like. Other applications of thermoplastic designs include logos and various signs and symbols that can be cut with a waterjet or laser into specific designs. To make road markings such as stop bars, turn arrows, crosswalks, school signs, etc., it is known in the art to make large quantities of batched melted thermoplastic material. Such material can then be applied to a conveyor belt in a uniform thickness and transported on a conveyor belt to an area where water is applied to rapidly cool the material.

The cooled material can be cut into specific rectangular pieces. For example, the material can be cut into sections 3' long×3' wide×0.125" thick, or other variations, which can then be stored for later cutting. These pieces of material can then be placed on a waterjet where a specific shape, such as a turn arrow or other signs or symbols, can be cut out of the sections. These preformed roadway markings can then be applied to a roadway or parking lot by placing the material in the desired location and heating it with a hot torch until it adheres to the pavement.

Current methods of manufacturing these preformed markings takes a long time, and typically a plant can require a minimum of five, and sometimes up to ten separate batch melters in order to meet production demands. This problem could be easily solved using one of the above-described continuous melters utilizing a pump for hot oil jacketing around the melter, which can then be scaled to meet the specific demands of a plant.

In this embodiment, the oil pump is used to rapidly pump oil through a triple bypass burner device. The heated oil then surrounds the melter and all piping that the thermoplastic must travel through before circulating back through a heat exchanger and then back into the melter. A computer is preferably employed to monitor the temperature of both the oil and the thermoplastic to ensure that the right amount of heat is applied around the thermoplastic in order to tightly control the temperature. The computer sensor is helpful because overheating the thermoplastic can be detrimental to its composition.

Figure 14:
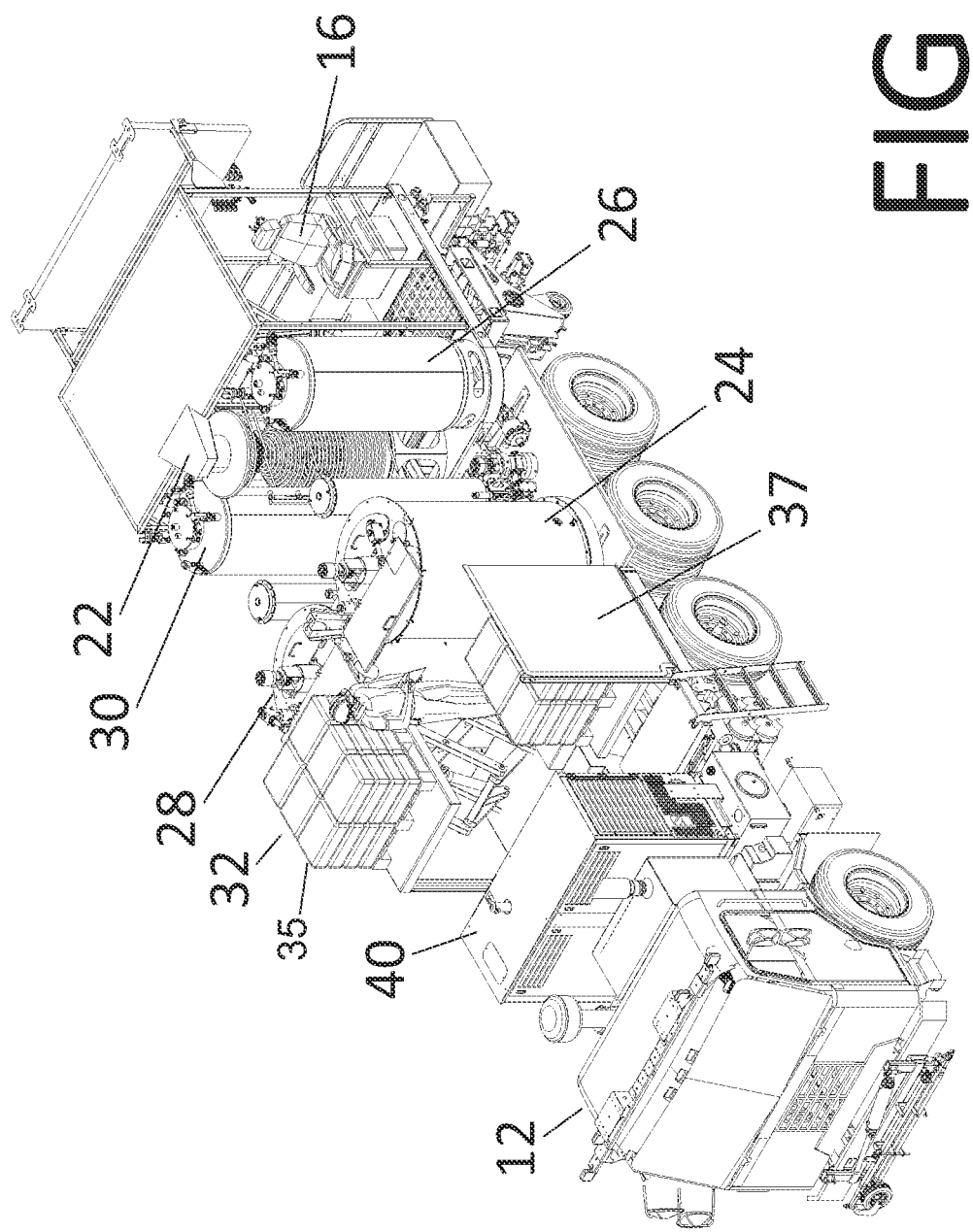
FIG. 14 is a perspective view of the thermoplastic extrusion vehicle with a scissor lift.

Referring to FIGS. 14-15, illustrated is the thermoplastic extrusion vehicle 10 having scissor lifts 35 and 37. Similar to the embodiment depicted in FIGS. 1-2, a cab 12 at the front of the vehicle for placement of a driver, and a control area 14 located at the rear of the vehicle, wherein an operator has a seat 16 and access to a PLC controller 18. A first color melting kettle assembly 24 and a second color melting kettle assembly 28. The storage area 32 is used to accept bags of material, which can be loaded into the first melting kettle 24 by an operator who can slide the bags off the storage area without lifting. The scissor lifts 35 and 37 raise the bags to the appropriate level. A power generator 40 is mounted behind the cab 12.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for measuring applied line thickness by a thermoplastic extrusion vehicle comprising:
   a melter reservoir secured to the vehicle having an inlet and an outlet;
   a sensor for detecting a level of thermoplastic material in said melter;
   a computer having a microprocessor coupled to said sensor configured to calculate an amount of thermoplastic material in said melter based upon the level detected;
   a counter positioned at said inlet to said melter configured to count bags of raw thermoplastic material added to said melter and said microprocessor configured to receive a bag count from said counter to calculate an amount of thermoplastic material added to said melter;
   a magnetic collar attached to a drive shaft of the vehicle and coupled to said microprocessor, said magnetic collar configured to calculate a distance traveled by the vehicle;
   a pump for transferring liquid thermoplastic material, said pump coupled to said computer; and
   at least one gun having a predetermined spray width attached to said pump;
   wherein said system for measuring applied line thickness and said computer are configured to derive a mil thickness of the line applied by calculating any change in the thermoplastic material amount in said melter, with adjustment made to the amount of thermoplastic material added, and the distance the vehicle traveled while said at least one gun having said predetermined spray width provides a mil thickness of the line applied.

2. The system for measuring applied line thickness according to claim 1 wherein said computer is configured to control said pump to obtain a target mil thickness from said at least one gun.

3. The system for measuring applied line thickness according to claim 1 wherein said computer is configured to control a vehicle speed to obtain a target mil thickness.

4. The system for measuring applied line thickness according to claim 1 including a liquid level tube placed adjacent to said melter reservoir, said liquid level tube allowing surface measurement by said sensor.

5. The system for measuring applied line thickness according to claim 4 wherein said liquid level tube includes an oil jacket to maintain thermoplastic material within said liquid level tube at the same temperature as the thermoplastic material in said melter reservoir.

6. The system for measuring applied line thickness according to claim 1 wherein said sensor comprises a laser.

7. The system for measuring applied line thickness according to claim 1 wherein said sensor is an ultrasonic sensor.

* * * * *